Figures 1, 2:
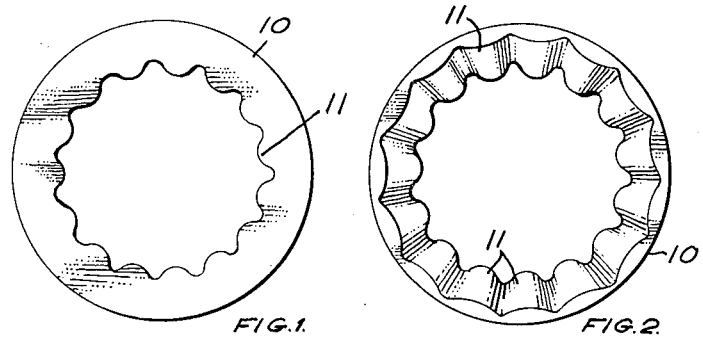

Dec. 28, 1965     E. S. GASKELL     3,225,714

DOUGH-MOULDING MACHINES

Filed May 2, 1963     2 Sheets-Sheet 1

INVENTOR:
Edward S. Gaskell
BY
Bierman & Bierman
Attorneys

Dec. 28, 1965  E. S. GASKELL  3,225,714
DOUGH-MOULDING MACHINES
Filed May 2, 1963  2 Sheets-Sheet 2
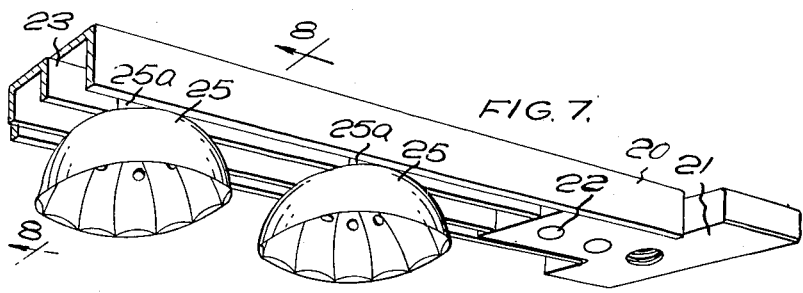
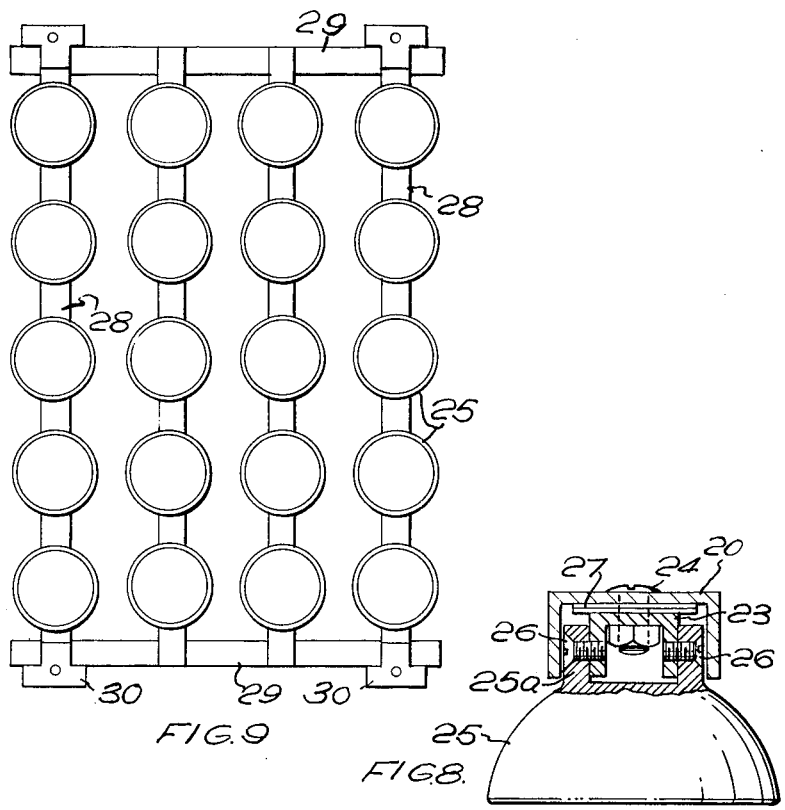
INVENTOR:
Edward S. Gaskell
BY
Attorneys

United States Patent Office 3,225,714
Patented Dec. 28, 1965

3,225,714
DOUGH-MOULDING MACHINES
Edward Stanley Gaskell, Highbury, Milton Grove, Orrell Mount, Wigan, Lancashire, England
Filed May 2, 1963, Ser. No. 277,565
Claims priority, application Great Britain, May 5, 1962, 17,364; Apr. 4, 1963, 13,339
8 Claims. (Cl. 107—19)

This invention relates to dough-moulding machines of the kind, hereinafter termed the kind referred to, in which moulding rings and cups are used for working pieces of dough in the manufacture of buns, rolls, teacakes and other like articles of food prepared from dough.

In such machines there are a plurality of moulding rings or cups arranged in rows, with several in each row, to the first of which measured pieces of dough are delivered for moulding into a ball. Conveniently, in the first row are open-topped rings into which the pieces of dough may be delivered. The rings and cups are positioned above a conveyor belt and though they do not turn, are given a gyratory motion for a short time, usually about three seconds, after which they are all raised simultaneously and the belt advanced for the distance between the rows of cups. The pieces of dough should stay on the conveyor band when the rings and cups are raised so as to be moved forward into register with the next row of cups, and when the cups are lowered again such pieces of dough receive a second gyratory moulding treatment whilst new portions of dough are placed in the rings of the first row, and so on. An operative or automatic mechanism removes the moulded shapes of dough from the band as they leave the zone of the last row of cups and places them into proving boxes or onto baking sheets.

One of the problems with such dough-moulding machines of the kind referred to is that some of the pieces of dough tend to stick to their rings or cups and either stay in or partly stay in and cause trouble or leave later, when they are thrown out of register on the band and also cause trouble. Either of these conditions results in mis-forming or mis-sizing of the balls of dough. When this happens, as is too frequently the case, the machine has to be stopped and the trouble cleared up before restarting so that much time and output can be lost.

Another problem in connection with such dough-moulding machines is the effective mounting of the cups because the gyratory motion to which they are subjected tends to loosen such mounting, which permits unwanted movement or displacement of the cups thus detracting from their efficiency, and may even result in the detachment of a cup and/or release of its fixing screw amongst the pieces of dough.

A still further problem lies in the fact that there are several proprietary makes of such machines, all of different sizes and construction, so that the application thereto of the improved dough-moulding cup of the earlier invention aforesaid has hitherto entailed the construction of individually shaped cups to fit existing cup-holders of each such machine whilst entailing the use of the existing mounting and securing means, with any inherent disadvantages as aforesaid, and the individual mounting in situ of each cup.

The object of the present invention is to overcome the aforesaid problem.

According to one feature of the invention a moulding ring or cup for a dough-moulding machine of the kind referred to is characterised in that the moulding wall of the ring or cup is formed with dough working formations, preferably ribs having a substantial axial directional component. Preferably, the ring or cup is bell-mouthed at least at its lower end.

The expression "dough-working ribs having a substantial axial directional component" is used herein to define an arrangement in which the ribs or undulations are so shaped as to knead or work the dough and are parallel to the axis of the mould or deviate therefrom in a helical manner in such direction and at such angle as to apply, combined with the bell-mouthed shaping if any, a kneading or working action with downward force to the dough by reason of the gyration of the cup and thereby assist gravity for adhesion of the dough to the conveyor belt.

According to another feature, the invention comprises a cup unit for a dough-moulding machine comprising a frame member, mounting means for said frame member for attaching it to the moulding machine, a cup-holding member adapted to carry a plurality of detachable cups and to be detachably secured to the said frame member.

Figure 3:
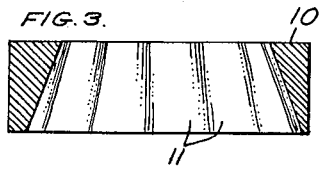
Figure 6:
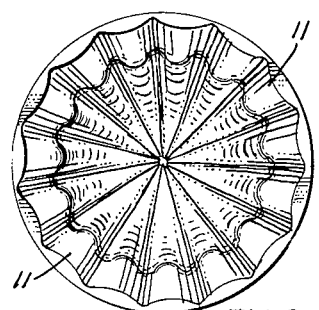
Figure 5:
Figure 4:
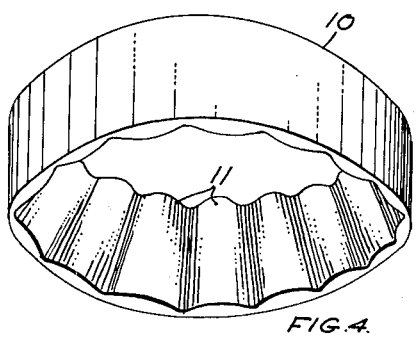

In the accompanying drawings:
FIG. 1 is a plan,
FIG. 2 is an inverted plan,
FIG. 3 is a sectional elevation, and
FIG. 4 is an underneath perspective view of one example of a dough-moulding cup made in accordance with the present invention.
FIGS. 5 and 6 are cross-sectional elevation and inverted plan respectively of a modified construction of moulding cup made in accordance with the present invention.
FIG. 7 is an isometric part sectional view showing one example of a cup unit made in accordance with the present invention.
FIG. 8 is a cross section on line 8—8 of FIG. 7.
FIG. 9 shows another example of a cup unit according to the invention.

As shown in FIGS. 1 to 4 of the drawings, a dough-moulding cup for a dough-dividing and -moulding machine comprises a ring 10 made of cast aluminum of such external diameter as to be secured, in any suitable manner, in the cup-holding rings of the machine. The ring which is 3⅜ inches external diameter and 1½ inches long is tapered internally to an angle of about 40 degrees so as to be bell-mouthed and is formed with fourteen radial convex ribs 11.

In operation, owing to the gyratory movement and internal taper of the cup, the dough is urged downwardly onto the conveyor band so as to ensure its effective moulding adhesion thereto, whilst the ribs work over the external surface of the dough leaving air spaces between them which reduces any tendency of the dough to stick to the mould. The working surface of the cup may be treated for example with a silicone preparation to provide a moisture repellant effect. The dough-working surface of the ring may be knurled with straight or criss-cross lines.

In experimental use, it has been found that any tendency for the dough to stick in the cup is substantially eliminated and dough can be satisfactorily moulded of a softer consistency then is practical to mould in moulding cups as at present used, and which would be and now necessarily is moulded by hand. The rotational working of the dough is better and the product is thereby improved.

In working some types of dough it is found necessary in practice to close the top of the moulding ring. At present, this closure is effected by means of a felt pad, but any such felt increases the risk of adherence of the dough.

As shown in FIGS. 5 and 6, the mould may be made as a cup with a top 12, enclosing or partially enclosing as shown, the top of the mould and with the undulations extended across the underside thereof. The working surface of such cups may be treated as above described for the ring of FIGS. 1 to 4. Air holes may be formed in the said top.

In use, the modification above described will reduce the said risk and will conveniently be used in the second and subsequent rows in preference to open rings while the rings in the first row may be deeper to preclude any escape of the dough through the open top.

As shown in FIGS. 7 and 8 of the drawings the cup unit comprises a channel-shaped main frame member 20 with a mounting adaptor 21 at each end located in the channel and secured therein by rivets 22. Housed within the frame member is a channel-shaped cup-holding frame member 23 detachably secured by screws 24. Cups 25 of the required size and spacing are secured by their lugs 25a and screws 26 to the member 23. When housed in the frame member the screws 26 are captive. Spacing washers 27 are located on the screws 24 so that the height of the rims of the rings or cups relative to the conveyor band over which they are gyrated, is adjustable to vary the clearance.

As shown in FIG. 9 the unit consists of several frame members 28 similar to frame members 20 shown in FIGS. 7 and 8, connected by cross members 29 to make a multiple row cup unit. Mounting members 30 need not be fitted to each frame member.

By forming the cup-holding member with a plurality of alternative holes for the fixing screws 16, the size and spacing of the cups may be altered to suit a range of requirements.

As is easily appreciated, a relatively small stock of frame members and cup-holding members and interchangeable mounting members will enable cup units to be made to fit a wide variety and sizes of dough-moulding machines which are easily mounted in place of the existing cups.

What I claim is:

1. A moulding machine of the class described having a gyratory frame member and a moulding ring or cup supported on said frame member for gyration therewith to knead or work dough pieces, characterized in that the interior and moulding wall of said ring or cup is provided with a plurality of spaced apart substantially convex ribs with intermediate concave undulations, said ribs extending axially of said ring or cup and being convex in cross-section transversely of said ribs, and extending substantially from the top to the mouth or bottom of said ring or cup as dough-working formations.

2. A dough moulding machine according to claim 1 further characterized in that said ribs taper inwardly from the bottom of said ring.

3. A dough moulding machine according to claim 1 further characterized in that said rib formations are knurled.

4. A dough moulding machine according to claim 1 further characterized in that the spaces between adjacent ribs are concave in cross section.

5. A dough moulding machine according to claim 1 further characterized in that the top of said ring is at least partially closed and said ribs extend into said top.

6. A dough-molding machine of the class described having a gyratory main frame, a cup-holding frame attached thereto and rings or cups mounted on said cup-holding frame, characterized in that the interior moulding wall of each ring or cup is provided with a plurality of spaced apart convex ribs extending axially of said ring or cup and being convex in cross-section transversely of said ribs and extending substantially from the top to the mouth of said ring or cup, and further characterized in that a plurality of said rings may be mounted in alinement on said cup-holding frame and said cups have a mounting member extending therefrom into said cup-holding frame.

7. A dough moulding machine according to claim 6 further characterized in that said cup-holding frame may be located within said main frame when attached thereto.

8. A dough moulding machine according to claim 7 further characterized in that the mounting members of said cups comprise at least one upstanding lug attached to said cup-holding frame.

References Cited by the Examiner

UNITED STATES PATENTS

| 614,797 | 11/1898 | Dobson | 107—9.7 |
|---|---|---|---|
| 786,042 | 3/1905 | Loncaric | 107—9.7 |
| 1,948,870 | 2/1934 | Pointon et al. | 107—9.7 |
| 2,470,593 | 5/1949 | Webb | 220—64 |
| 2,655,876 | 10/1953 | Stickelber | 107—12 |
| 2,781,732 | 2/1957 | Lenherr | 107—4.3 |

FOREIGN PATENTS

| 819,536 | 7/1937 | France. |
|---|---|---|
| 569,291 | 2/1933 | Germany. |

WALTER A. SCHEEL, *Primary Examiner.*

CHARLES A. WILLMUTH, ROBERT E. PULFREY,
*Examiners.*